(12) United States Patent
Sawano

(10) Patent No.: US 7,760,921 B2
(45) Date of Patent: Jul. 20, 2010

(54) PRESSURE ACTIVATED FINGERPRINT INPUT APPARATUS

(75) Inventor: Tomomi Sawano, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 1048 days.

(21) Appl. No.: 11/137,615

(22) Filed: May 24, 2005

(65) Prior Publication Data

US 2005/0213799 A1 Sep. 29, 2005

Related U.S. Application Data

(63) Continuation of application No. PCT/JP03/15845, filed on Dec. 11, 2003.

(30) Foreign Application Priority Data

Dec. 19, 2002 (JP) .............................. 2002-368558

(51) Int. Cl.
G06K 9/00 (2006.01)

(52) U.S. Cl. ...................... 382/124; 382/125; 382/126; 382/128; 382/127

(58) Field of Classification Search ................ 382/124, 382/125, 126, 127, 128
See application file for complete search history.

(56) References Cited

U.S. PATENT DOCUMENTS

| | | | |
|---|---|---|---|
| 5,088,817 A * | 2/1992 | Igaki et al. ...................... 356/71 |
| 5,635,723 A * | 6/1997 | Fujieda et al. ............... 250/556 |
| 6,131,464 A * | 10/2000 | Pare et al. ...................... 73/714 |
| 6,141,436 A | 10/2000 | Srey et al. |
| 2002/0054394 A1 | 5/2002 | Sasaki et al. |
| 2002/0106115 A1 | 8/2002 | Rajbenbach et al. |
| 2002/0146204 A1* | 10/2002 | Gerdt et al. ................... 385/43 |
| 2002/0196036 A1* | 12/2002 | Toyoshima et al. ......... 324/702 |

FOREIGN PATENT DOCUMENTS

| | | | |
|---|---|---|---|
| JP | 58-201178 A | 11/1983 |
| JP | 61-283994 A | 12/1986 |
| JP | 63-228270 A | 9/1988 |
| JP | 86208580 | 5/1997 |
| JP | 2001-077342 A | 3/2001 |
| JP | 2001-143056 A | 5/2001 |
| JP | 2002-94040 A | 3/2002 |

OTHER PUBLICATIONS

Japanese Office Action dated Jan. 20, 2009 (2 pages), and English translation thereof (3 pages), issued in a counterpart Japanese Application No. 2002-368558.

Japanese Office Action (and English translation thereof) dated Oct. 21, 2008, issued in a counterpart Japanese Application.

Japanese Office Action dated Jun. 9, 2009 and English translation thereof issued in counterpart Japanese Application No. 2002-368558.

* cited by examiner

Primary Examiner—Matthew C Bella
Assistant Examiner—Mike Rahmjoo
(74) Attorney, Agent, or Firm—Frishauf, Holtz, Goodman & Chick, P.C.

(57) ABSTRACT

An image input apparatus includes an image reading assembly positioned below a placement surface on which an object to be examined is placed, and a sensing circuit for sensing that the object is placed on the placement surface, in accordance with a pressure applied to the placement surface.

6 Claims, 8 Drawing Sheets

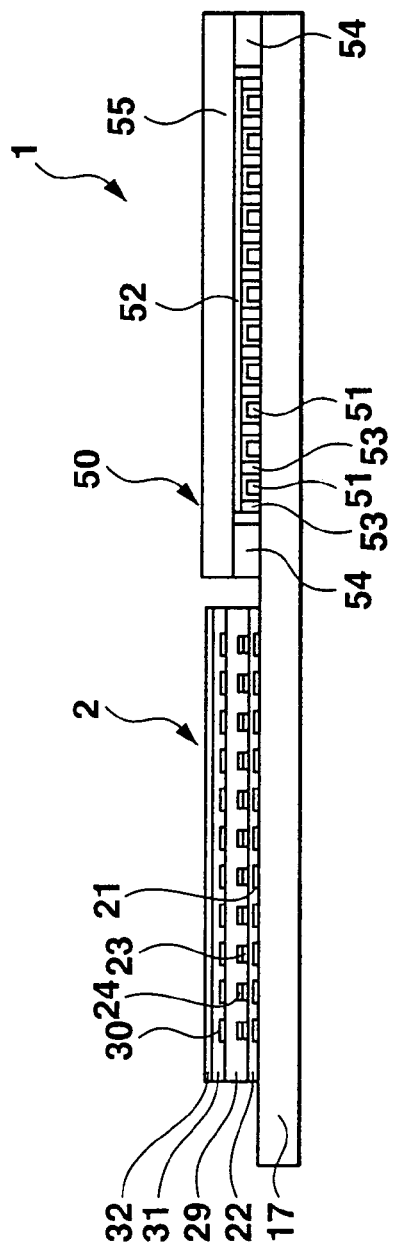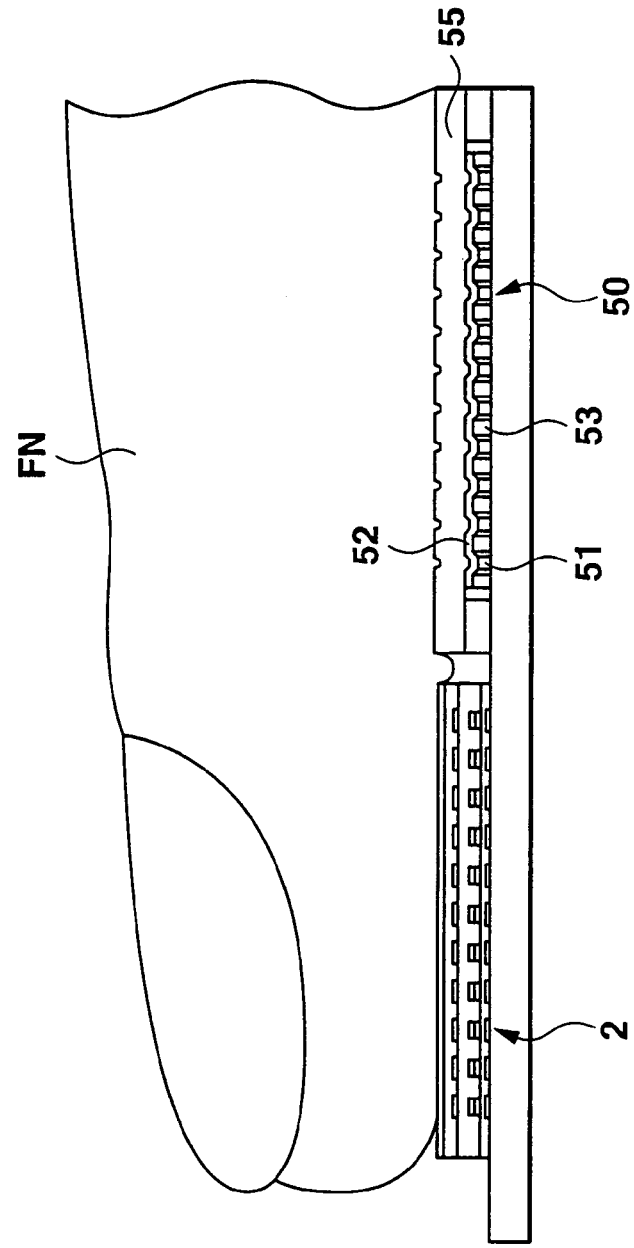
FIG.2A
FIG.2B

PRESSURE ACTIVATED FINGERPRINT INPUT APPARATUS

CROSS REFERENCE TO RELATED APPLICATIONS

This is a Continuation Application of PCT Application No. PCT/JP03/15845, filed Dec. 11, 2003, which was published under PCT Article 21(2) in Japanese.

This application is based upon and claims the benefit of priority from prior Japanese Patent Application No. 2002-368558, filed Dec. 19, 2002, the entire contents of which are incorporated herein by reference.

BACKGROUND OF THE INVENTION

1. Field of the Invention

The present invention relates to an image input apparatus which includes an image reading circuit positioned below a placement surface on which an object to be examined is placed, and inputs an image of the object by reading the object by an image reading device.

2. Description of the Related Art

A fingerprint has a pattern unique to an individual and hence is a very useful means for authenticating a person. Recently, a fingerprint authentication apparatus which applies a fingerprint to personal authentication is developed. More specifically, this fingerprint authentication apparatus performs personal authentication by comparing a fingerprint image read by an image reader with fingerprint image data of a preregistered person. It is being attempted to mount this fingerprint authentication apparatus in information apparatuses such as a personal computer, PDA (Personal Digital Assistance), and cell phone.

Jpn. Pat. Appln. KOKAI Publication No. 2002-94040 describes a two-dimensional image reader to be used in the fingerprint authentication apparatus. This two-dimensional image reader includes a photosensor array in which a plurality of photosensors are arranged on a transparent substrate, a backlight positioned at the back of the photosensor array so as to oppose its rear surface, a transparent electrode layer covering the surface of the photosensor array, and a sensor for sensing a voltage change in the electrode layer. The operation of the conventional two-dimensional image reader and a method of using it will be explained below. When a person to be examined places his or her finger on the electrode layer, the sensor senses a unique voltage change caused by the contact of the finger with the electrode layer, since the person himself or herself has a unique resistance and capacitance. In accordance with this finger sensing by the sensor, the backlight illuminates the finger with light, and the photosensor array reads an image of the finger by an image reading operation. This finger image read by the photosensor array is represented by the intensity distribution of reflected light from projections and recesses of the finger on the contact surface.

A finger perspiration state differs from one person to another, and a pressure with which a finger placed on the electrode layer presses the electrode layer also differs from one person to another. Different finger perspiration states cause different unique voltage changes when these fingers come in contact with the electrode layer. Similarly, different electrode layer pressing forces of fingers cause different electrode layer voltage changes because the contact areas between these fingers and the electrode layer are also different. In the conventional two-dimensional image reader, therefore, if the tolerance of variations in perspiration state between individuals and the tolerance of variations in finger pressure are too small, a finger of a certain person placed on the electrode layer may not be sensed by the sensor and so a fingerprint image of this person cannot be read, while a finger of another person placed on the electrode layer can be sensed by the sensor and so a fingerprint image of this person can be read. The perspiration state or pressing force of a finger of even the same person may change in some cases, so a fingerprint image of the finger cannot be read in this case. Also, if the tolerance is too large, an operation error may be caused by an object, other than a finger, which comes in contact with the electrode layer. Likewise, if the tolerance is extended to cover even weak electrode layer pressing forces, projections of a finger do not come in close contact with the electrode layer. Since the pattern of the fingerprint cannot be clearly read in this case, accurate authentication may not be performed. Furthermore, such very small voltage changes cannot be accurately sensed owing to noise such as ambient electromagnetic waves.

BRIEF SUMMARY OF THE INVENTION

It is an object of the present invention to provide an image input apparatus capable of simply and reliably reading an image and capable of reading a clear image.

To achieve the above object, an image input apparatus according to an aspect of the present invention comprises: an image reading assembly having, on one side, a placement surface on which an object to be examined is placed; and sensing means for sensing that the object is placed on the placement surface, in accordance with a pressure applied to the placement surface by the object.

In the invention of the above aspect, when an object to be examined is placed on the placement surface, a pressure is applied from the object to the placement surface. Since the sensing means senses the placement of the object by the pressure applied to the placement surface, a reading operation of the image reading circuit can be stopped when no object to be examined is placed on the placement surface, and can be immediately started when an object to be examined is placed on the placement surface. Therefore, the power consumption when no object to be examined is placed on the placement surface can be reduced. Also, it is unnecessary to perform any special operation except for placing a finger in order to initiate a reading operation. Accordingly, an image of an object to be examined can be reliably read only by placing the object on the placement surface.

Also, when a finger is an object to be examined, it is conventionally impossible to sense the placement of the finger in some cases owing to, e.g., the perspiration state of the finger. In the present invention, however, a pressure is applied to the placement surface when a finger is placed on the placement surface, so the sensing means can reliably sense the placement of the finger. This makes it possible to reliably read a finger's image.

The sensing means may comprise a pressure sensor which senses a pressure applied to the placement surface, and comparing means for comparing a pressure level sensed by the pressure sensor with a threshold value for discriminating between a placed state and unplaced state and, if the threshold value is reached, outputting a trigger signal for causing the image reading circuit to perform an image reading operation.

When an object to be examined is placed on the placement surface, a pressure is applied from the object to the placement surface. However, if this pressure applied from the object to the placement surface is low, the contact area between the object and placement surface becomes small. Therefore, even if the image reading circuit reads an image, no clear image can be read. With this arrangement, however, unless the level of a sense signal indicating the pressure applied from an object to be examined to the placement surface is equal to or higher than a threshold value, the comparing means outputs no trigger signal, so the image reading circuit performs no image reading operation. Therefore, no such unclear image is read. If the level of the sense signal indicating the pressure applied from an object to be sensed to the placement surface exceeds the threshold value, the comparing means outputs a trigger signal, and the image reading circuit performs an image reading operation. As a consequence, the image reading circuit reads an image when the contact area between an object to be examined and the placement surface is sufficiently large, so a clear image can be reliably read.

When the invention of the above aspect comprises adjusting means for adjusting the brightness of a light source for irradiating the object with light, in accordance with a pressure which the object applies to the placement surface, the irradiation intensity by the light source is adjusted on the basis of the pressure applied to the placement surface by the object, so light having intensity matching the contact area between the object and placement surface is incident on the object. Accordingly, an image of the object can be clearly read regardless of the contact pressure applied by the object.

An image input apparatus according to another aspect of the present invention comprises: an image reading assembly having, on one side, a placement surface on which an object to be examined is placed; and sensing means placed on the other side of the image reading assembly to sense that the object is placed on the placement surface, in accordance with a pressure applied to the placement surface by the object.

In this structure, the sensing means can stop a reading operation of the image reading circuit when no object to be examined is placed on the placement surface, and can immediately start a reading operation of the image reading circuit when an object to be examined is placed on the placement surface. In addition, since the sensing means is positioned below the image reading circuit, the two-dimensional size of the image input apparatus can be decreased. Therefore, this image input apparatus is particularly effective as an authentication apparatus of a highly portable device.

An image input apparatus according to still another aspect of the present invention comprises: sensing means for outputting a sense signal in accordance with a pressure of a finger when the finger is placed on the sensing means; a plurality of sensor elements which are positioned below a fingerprint portion of the finger when the finger is placed on the sensing means, and read an image corresponding to projections and recesses of the finger; and a driving circuit which starts an image reading operation of the plurality of sensor elements in accordance with the sense signal.

As described above, the plurality of sensor elements are so arranged that they are positioned below a fingerprint portion of a finger when the finger is placed on the sensing means. This makes an easy image reading operation feasible. In addition, when no finger is placed on the sensing means, the sensor elements perform no image reading operation, so the power consumption can be reduced.

BRIEF DESCRIPTION OF THE SEVERAL VIEWS OF THE DRAWING

FIG. 2A is a sectional view taken along a line (II)-(II) in FIG. 1 and showing the state in which no finger is placed, and FIG. 2B is a sectional view taken along the line (II)-(II) in FIG. 1 and showing the state in which a finger is placed;

DETAILED DESCRIPTION OF THE INVENTION

Figure 1:
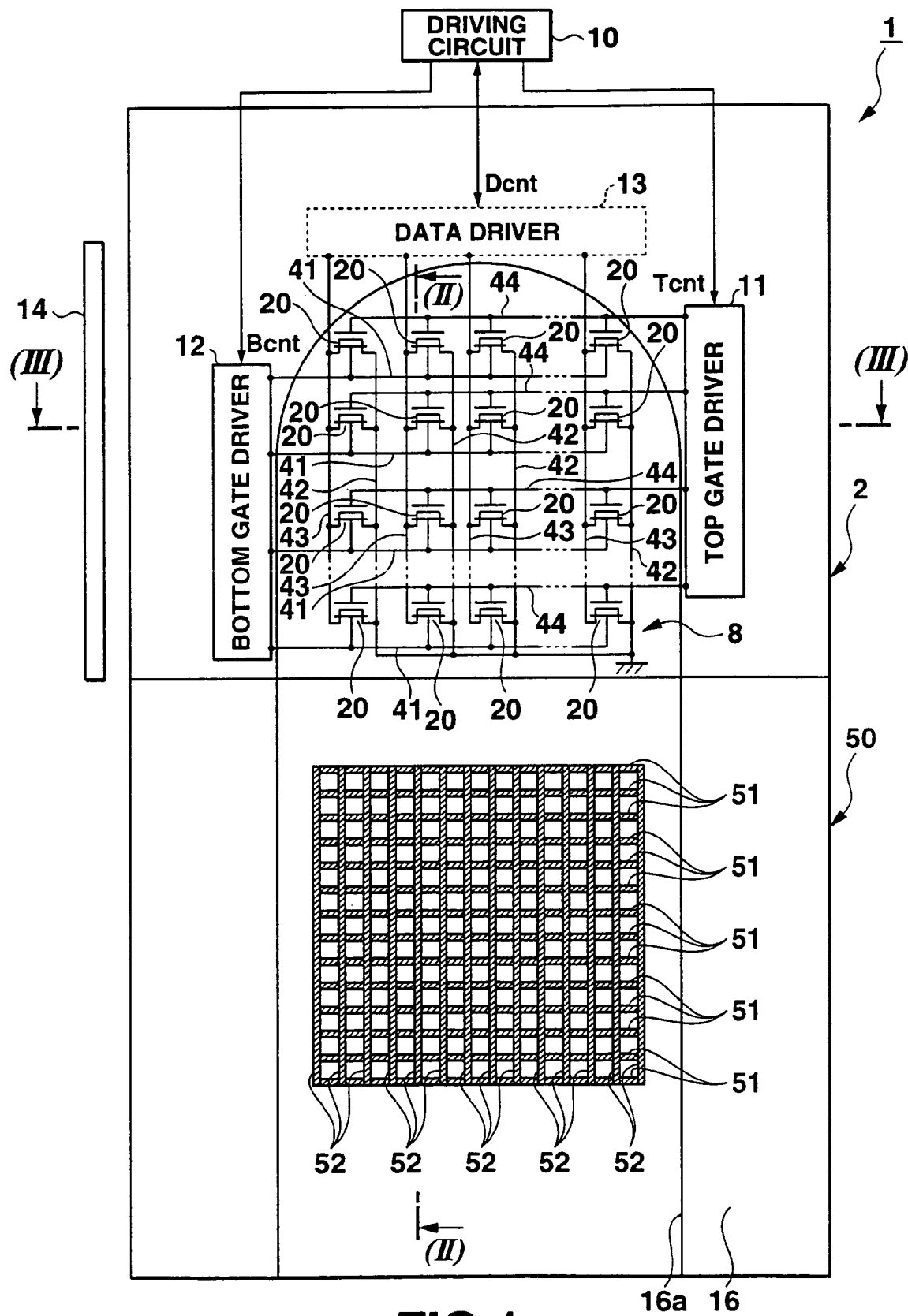
FIG. 1 is a plan view showing a fingerprint reader to which an image input apparatus of an embodiment of the present invention is applied.

Embodiments of the present invention will be described below with reference to the accompanying drawing. However, the scope of the invention is not limited to these embodiments shown in the drawing.

First Embodiment

Figure 3:
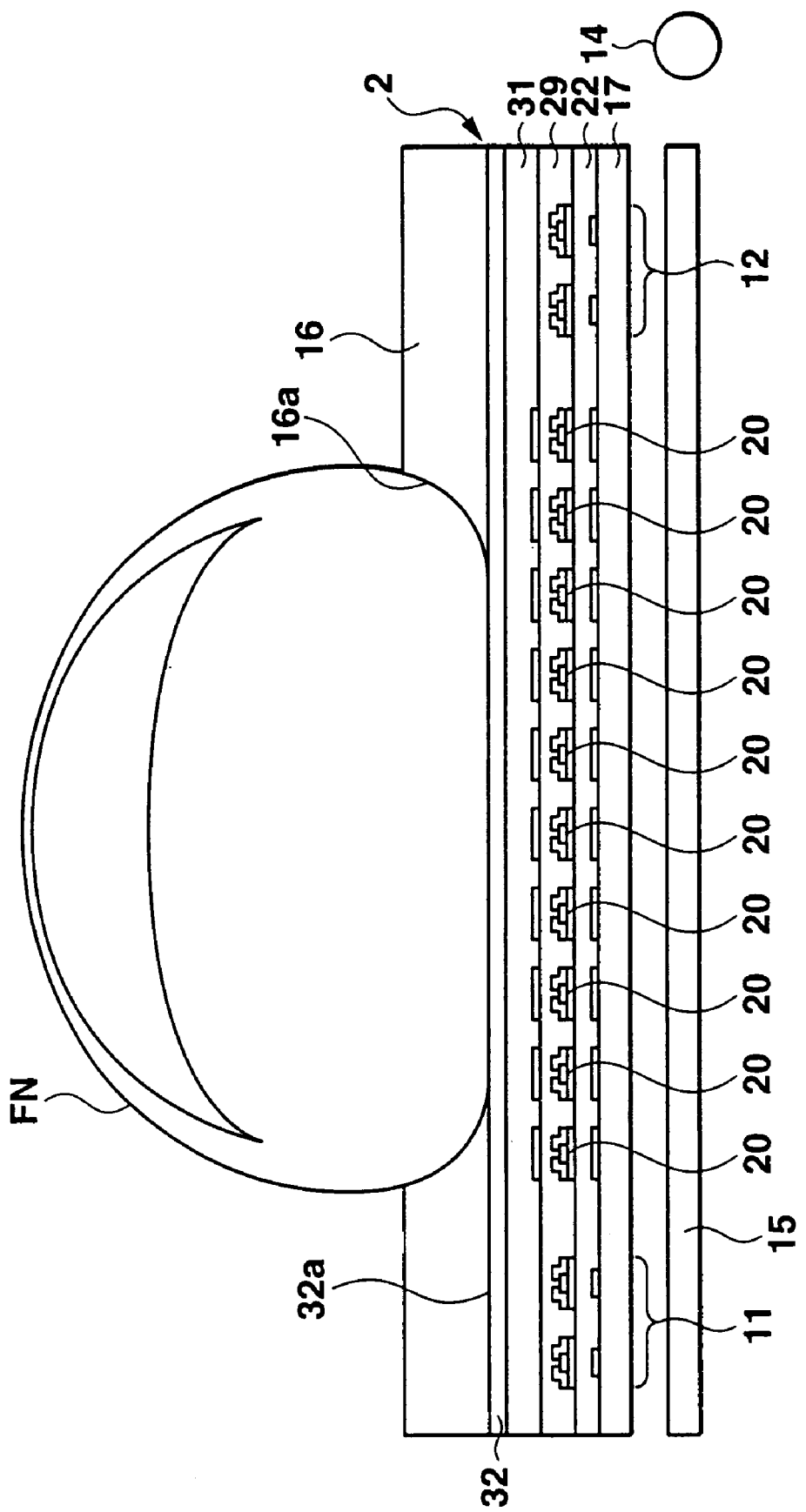
FIG. 3 is a sectional view taken along a line (III)-(III) in FIG. 1 and showing an image reading circuit of the fingerprint reader.

FIG. 1 is a plan view showing a fingerprint reader 1 to which an image input apparatus of the present invention is applied. FIGS. 2A and 2B are sectional views taken along a line (II)-(II) in FIG. 1 and showing the state in which no finger is placed and the state in which a finger is placed, respectively. FIG. 3 is a sectional view taken along a line (III)-(III) in FIG. 1.

The fingerprint reader 1 has an image reading circuit 2 or image reading assembly which reads a fingerprint image of a portion of a finger FN beyond the first joint placed on a contact surface 32a, by converting the amount or intensity of light reflected by the finger FN and that of light transmitted through the finger FN into electrical signals. The image reading circuit 2 is obtained by integrating a solid-state image pickup device and its drivers, and includes the contact surface 32a on one side, in this embodiment, the upper side. The fingerprint reader 1 also comprises a driving circuit 10 for acquiring fingerprint image data of the finger FN by sensing the electrical signals from the image reading circuit 2, a light irradiating means for irradiating the finger FN placed on the contact surface 32a of the image reading circuit 2 with light, a film-type pressure sensor 50 for sensing a pressure generated when a portion of the finger FN from the second joint to the first joint comes in contact with the sensor, and a finger holder 16 for holding the finger FN in a predetermined position in the image reading circuit 2 and pressure sensor 50.

First, the light irradiating means will be explained below. The light irradiating means includes, a light source 14 such as an LED for emitting light or a cold cathode fluorescent lamp, and a diffusion light-guiding plate 15 for guiding light emitted from the light source 14 to the image reading circuit 2, and irradiating the finger FN as an object to be examined with the light via the image reading circuit 2. The diffusion light-guiding plate 15 is a substantially flat plate and is covered with a light-reflecting material (not shown) except for one side surface facing the light source 14 and one surface or the upper surface facing the rear surface of the image reading circuit 2. The light from the light source 14 enters the diffusion light-guiding plate 15, two-dimensionally diffuses in the diffusion light-guiding plate 15, and is two-dimensionally radiated from the surface of the diffusion light-guiding plate 15. The rear surface of the image reading circuit 2 is evenly irradiated with this light. Instead of the diffusion light-guiding plate 15 and light source 14, a surface light-emitting element such as an organic EL element may also be disposed so as to oppose the rear surface of the image reading circuit 2.

Figure 4A:
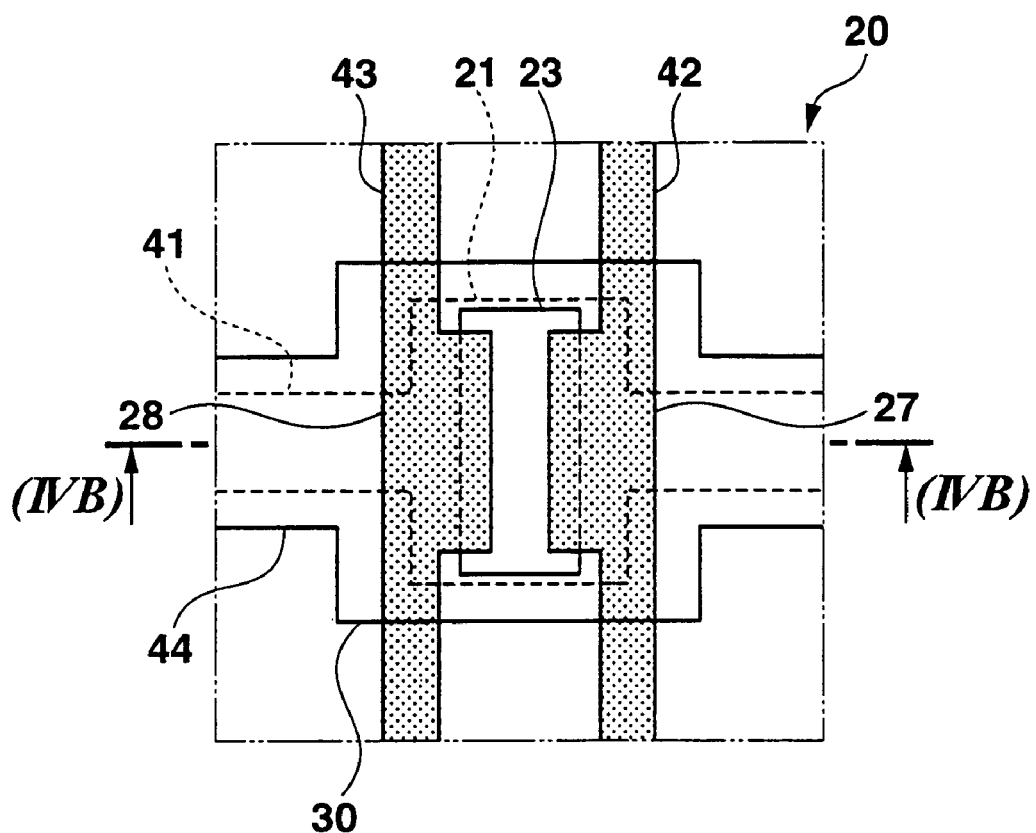
FIG. 4A is a plan view showing one pixel of the image reading circuit.
Figure 4B:
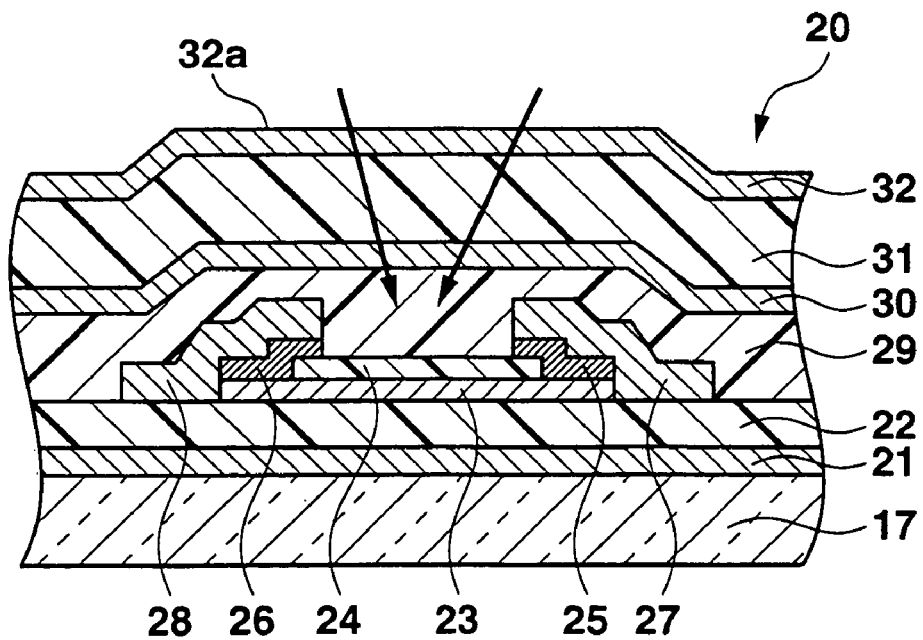
FIG. 4B is a sectional view taken along a line (IVB)-(IVB)

The image reading circuit 2 will be explained below with reference to FIGS. 1 to 4B. FIG. 4A is a plan view showing one pixel of the image reading circuit 2. FIG. 4B is a sectional view taken along a line (IVB)-(IVB) in FIG. 4A.

The image reading circuit 2 includes a substantially flat transparent substrate 17, photosensor elements (to be referred to as sensor elements hereinafter) 20 which are a plurality of N-channel double-gate transistors arranged into a matrix of n rows×m columns on one surface or the upper surface of the transparent substrate 17, a top gate driver 11, bottom gate driver 12 and data driver 13 formed around an image input region 8 in which the sensor elements 20 are arranged on the transparent substrate 17; a protective insulating film 31 for covering the drivers 11, 12, 13 and sensor elements 20; and an antistatic film 32 formed on the protective insulating film 31.

The transparent substrate 17 has transmitting properties (to be simply referred to as transparency hereinafter) to light having a wavelength region which can be sensed by the sensor elements 20, of the light emitted from the light source 14, has insulating properties, and can be formed by a glass substrate such as quartz glass or a plastic substrate such as polycarbonate. The transparent substrate 17 forms the rear surface of the image reading circuit 2. The diffusion light-guiding plate 15 faces the transparent substrate 17.

Each sensor element 20 is a photoelectric conversion element serving as a pixel, and includes a bottom gate electrode 21 formed on the transparent substrate 17, a bottom gate insulating film 22 formed on the bottom gate electrode 21, a semiconductor film 23 so formed as to sandwich the bottom gate electrode 21 with the bottom gate insulating film 22 and facing the bottom gate electrode 21, a channel protective film 24 formed by silicon nitride on a central portion of the semiconductor film 23, impurity-doped semiconductor films 25 and 26 formed apart from each other on the two end portions of the semiconductor film 23, and a source electrode 27 and drain electrode 28 formed on the impurity-doped semiconductor films 25 and 26, respectively. A top gate insulating film 29 is formed on exposed surfaces of the bottom gate insulating film 22 and channel protective film 24 including the upper surfaces of the source electrode 27 and drain electrode 28. Top gate electrodes 30 are formed on the top gate insulating film 29 so as to sandwich with the semiconductor films 23, the top gate insulating film 29 and channel protective films 24 and respectively face the semiconductor films 23.

The bottom gate electrodes 21 are arranged in a matrix manner on the transparent substrate 17 in one-to-one correspondence with the sensor elements 20 arranged in a matrix manner. On the transparent substrate 17, n bottom gate lines 41 are formed to run in the lateral direction. The bottom gate electrodes 21 of the sensor elements 20 in the same column in the lateral direction are integrated with a common bottom gate line 41. The bottom gate electrodes 21 and bottom gate lines 41 have conductivity and light shielding properties, and are made of, e.g., chromium, a chromium alloy, aluminum, an aluminum alloy, or an alloy of these metals.

On the bottom gate electrodes 21 and bottom gate lines 41, the bottom gate insulating film 22 common to all the sensor elements 20 is formed. The bottom gate insulating film 22 has insulating properties and transparency, and is made of, e.g., silicon nitride or silicon oxide.

On the bottom gate insulating film 22, the semiconductor film 23 is formed for each sensor element 20. Each semiconductor film 23 assumes a substantially rectangular shape when viewed from above. The semiconductor film 23 is a layer which is made of amorphous silicon or polysilicon and generates electron-hole pairs when irradiated with light having a predetermined wavelength region. The channel protective film 24 formed on the semiconductor film 23 has a function of protecting the interface of the semiconductor film 23 from an etchant used in patterning. The channel protective film 24 has insulating properties and transparency, and is made of, e.g., silicon nitride or silicon oxide. When light enters the semiconductor film 23, electron-hole pairs are generated in an amount corresponding to the incident light amount around the interface between the channel protective film 24 and semiconductor film 23. Of the generated carriers, the holes are held in the semiconductor film 23 and channel protective film 24 in accordance with electric fields of the bottom gate electrode 21 and top gate electrode 30.

The impurity-doped semiconductor film 25 on one end portion of the semiconductor film 23 partially overlaps the channel protective film 24. Likewise, the impurity-doped semiconductor film 26 on the other end portion of the semiconductor film 23 partially overlaps the channel protective film 24. The impurity-doped semiconductor films 25 and 26 are patterned for each sensor element 20. The impurity-doped semiconductor films 25 and 26 are made of amorphous silicon ($n^+$ silicon) containing n-type impurity ions.

The source electrode 27 and drain electrode 28 are formed by patterning on the impurity-doped semiconductor films 25 and 26 for each sensor element 20. On the bottom gate insulating film 22, m reference voltage lines 42 and data lines 43 are formed to run in the longitudinal direction. The source electrodes 27 of the sensor elements 20 in the same column running in the longitudinal direction are integrated with a common reference voltage line 42, and the drain electrodes 28 of the sensor elements 20 in the same column running in the longitudinal direction are integrated with a common data line 43. The source electrodes 27, drain electrodes 28, reference voltage lines 42, and data lines 43 have conductivity and transparency, and are made of, e.g., chromium, a chromium alloy, aluminum, an aluminum alloy, or an alloy of these metals.

The top gate insulating film 29 common to all the sensor elements 20 is formed on the channel protective films 24, source electrodes 27, drain electrodes 28, reference voltage lines 42, and data lines 43 of all the sensor elements 20. The top gate insulating film 29 has insulating properties and transparency, and is mode of, e.g., silicon nitride or silicon oxide.

On the top gate insulating film 29, the top gate electrode 30 patterned for each sensor element 20 is formed. n top gate lines 44 running in the lateral direction are formed on the top gate insulating film 29. The top gate electrodes 30 of the sensor elements 20 in the same row running in the lateral direction are integrated with the top gate lines 44. The top gate electrodes 30 and top gate lines 44 are conductors having conductivity and transparency, and are made of, e.g., indium oxide, zinc oxide, tin oxide, or a mixture (e.g., tin-doped indium oxide (ITO) or zinc-doped indium oxide) containing at least one of these compounds.

The sensor element 20 constructed as above is a photoelectric conversion element having the semiconductor film 23 as a light receiving portion.

On the top gate electrodes 30 and top gate lines 44 of all the sensor elements 20, the common protective insulating film 31 is formed in contact with the top gate electrodes 30 and top gate lines 44. The protective insulating film 31 has insulating properties and transparency, and is made of silicon nitride or silicon oxide.

The antistatic film 32 is formed on the entire surface of the protective insulating film 31. The antistatic film 32 has conductivity and transparency, and is made of, e.g., indium oxide, zinc oxide, tin oxide, or a mixture (e.g., tin-doped indium oxide (ITO) or zinc-doped indium oxide) containing at least one of these compounds. The antistatic film 32 is grounded and held at 0 (V), and removes static electricity of the finger FN, thereby preventing destruction of the sensor elements 20, top gate driver 11, bottom gate driver 12, and data driver 13 by static electricity. The contact surface 32*a* of the antistatic film 32 forms that surface of the image reading circuit 20, with which the finger FN comes in contact.

In the image reading circuit 2 described above, a portion of light entering the transparent substrate 17 from the diffusion light-guiding plate 15 is shielded by the bottom gate electrode 21 and hence does not directly enter the semiconductor film 23. Since the bottom gate electrodes 21 are not formed between the sensor elements 20, the remaining portion of the light is transmitted through these portions between the sensor elements 20 and emitted outside from the surface of the image reading circuit 2.

The drivers of the image reading circuit 2 will be described below. As shown in FIG. 1, the reference voltage lines 42 are held at a constant voltage, e.g., grounded and held at 0 (V). The bottom gate lines 41 are connected to the outputs of the bottom gate driver 12. The top gate lines 44 are connected to the outputs of the top gate driver 11.

The top gate driver 11 is a shift register, and outputs a reset signal in turn from the top gate line 44 in the first row to the top gate line 44 in the nth row (when the nth row is reached, the processing returns to the first row if necessary). When the reset signal is output to the top gate line 44 in a certain row, the top gate line 44 is set at a high-level reset potential which removes holes stored in the semiconductor films 23 and channel protective films 24. When the reset signal is not output to the top gate line 44 in a certain row, the top gate line 44 and the top gate electrodes 30 connected thereto are set at a low-level carrier storage potential which holds holes of electron-hole pairs generated by light entering the semiconductor films 23.

The bottom gate driver 12 is a shift register, and outputs a high-level read signal in turn from the bottom gate line 41 in the first row to the bottom gate line 41 in the nth row (when the nth row is reached, the processing returns to the first row if necessary). When the read signal is output to the bottom gate line 41 in a certain row, the bottom gate line 41 and the bottom gate electrodes 21 connected thereto are set at a read potential by which channels are formed in the semiconductor films 23. The size of each channel region depends upon the amount of light entering the semiconductor film 23.

The top gate driver 11 and bottom gate driver 12 shift their output signals such that after the top gate driver 11 outputs the reset signal to the top gate line 44 in the ith row (i is an integer from 1 to n), the bottom gate driver 12 outputs the read signal to the bottom gate line 41 in the ith row.

The data driver 13 outputs a pre-charge signal at a predetermined level (high level) to all the data lines 43 from the output timing of the reset signal to the output timing of the read signal. In addition, after outputting this pre-charge signal, the data driver 13 amplifies the voltage of the data lines 43, and outputs this amplified voltage to the driving circuit 10.

The driving circuit 10 will be explained below.

The driving circuit 10 outputs a control signal Bcnt to the bottom gate driver 12 to allow the bottom gate driver 12 to appropriately output the read signal, outputs a control signal Tcnt to the top gate driver 11 to allow it to appropriately output the reset signal, and outputs a control signal Dcnt to the data driver 13 to allow it to appropriately output the pre-charge signal. Also, the driving circuit 10 detects the voltage of the data lines 43 when a predetermined time has elapsed after the read signal is output, or detects the time from the output timing of the read signal to the timing at which the voltage of the data lines 43 reaches a predetermined threshold voltage, thereby acquiring a fingerprint image of the finger FN.

The pressure sensor 50 will be described below.

As shown in FIG. 2A, the pressure sensor 50 includes a plurality of electrode lines 51 arranged adjacent to the image reading circuit 2 on the transparent substrate 17, formed on the transparent substrate 17, and running parallel to each other in the row direction, spacers 53 formed between the adjacent electrode lines 51 on the transparent substrate 17 and higher than the electrode lines 51, a flexible sheet member 55 on the rear surface of which a plurality of electrode lines 52 running parallel to each other in the column direction are formed, and a seal 54 which covers the perimeter of the sheet member 55 and adheres the transparent substrate 17 and sheet member 55. The electrode lines 52 are separated from the electrode lines 51 by the spacers 53. The sheet member 55 and transparent substrate 17 are adhered such that the electrode lines 51 and 52 are perpendicular to each other when viewed from above and oppose each other. The spacers 53 may also be arranged between the electrode lines 52 on the rear surface of the sheet member 55. The spacers 53 need not always be formed if there is an enough restoring force with which the electrode lines 51 and 52 can be separated with no pressure applied after the pressure sensor 50 is repetitively pressed by a finger.

A sensing circuit 61 (to be described later) outputs a voltage to at least one of the electrode lines 51 and 52 of the pressure sensor 50. As shown in FIG. 2B, when the finger FN is placed on the image reading circuit 2 and pressure sensor 50, the pressure of the finger FN makes the sheet member 55 bend, and thus the electrode lines 52 bend downward to contact the electrode lines 51 accordingly. As a consequence, the electrode lines 51 and 52 electrically connect to each other. This changes the electrical characteristics such as an electric current flowing through the electrode lines 51 and 52, or the voltage or resistance of at least one of the electrode lines 51 and 52. This change in electrical characteristics is so designed as to be proportional to the force with which the finger FN presses the pressure sensor 50. Therefore, when the sensing circuit 61 senses an electrical characteristic change to such an extent that the finger FN well presses the pressure sensor 50, it is determined that the tip of the finger FN is placed on the image reading circuit 2, so the light source 14 emits light to start a reading operation of the image reading circuit 2. If the finger FN is not in close contact with the image reading circuit 2 because the finger FN is not enough pressing the pressure sensor 50, the electrical characteristic changes are small, so the driving circuit 10 does not perform a reading operation of the image reading circuit 2. Accordingly, not only does the image reading circuit 2 not read an image in which the fingerprint pattern of the finger FN is unclear because the contact is insufficient, but also the person to be examined can notice, since the light source 14 does not emit light, that he or she is not rejected by authentication but is not pressing the finger FN well. Therefore, the person tries to press the finger FN well against the pressure sensor 50 and image reading circuit 2 so that the driving circuit 10 performs a reading operation of the image reading circuit 2. Consequently, a clear image can be read, and this allows easy authentication.

In the pressure sensor 50, a pressure-sensitive ink layer may also be formed on the surface of at least one of the electrode lines 51 and 52. In this case, pressure-sensitive ink layers overlap each other at the intersections of the electrode lines 51 and 52. The electrical resistance between the electrode lines 51 and 52 depends upon a pressure applied to the pressure-sensitive ink layers. If the pressure changes, the electrical resistance or the like also changes. In the pressure sensor 50, the pressure at the intersection of the electrode lines 51 and 52 can be sensed by the electrical resistance or the like at the intersection. When the pressure sensor 50 is viewed from above, intersections are arranged in a matrix manner. Therefore, when the sensing circuit 61 measures a change in electrical characteristics of the electrode line 51 or 52 at each intersection, it is possible to sense the longitudinal pressure distribution and the whole longitudinal pressure. If the sensing circuit 61 senses that the longitudinal pressure distribution is substantially uniform, the pressure sensor 50 determines that a fingerprint portion at the tip of the finger FN is evenly placed on the image reading circuit 2, so the light source 14 emits light to start a reading operation of the image reading circuit 2. On the other hand, if the longitudinal pressure distribution is not uniform but significantly biased, a fingerprint portion at the tip of the finger FN may not be evenly touching the image reading circuit 2. Therefore, the light source 14 does not emit light, so a reading operation of the image reading circuit 2 is hot started.

As shown in FIG. 1, when viewed from above (in the direction of the contact surface 32a of the image reading circuit 2), the pressure sensor 50 and image reading circuit 2 are arranged in different positions. More specifically, the pressure sensor 50 is formed adjacent to the image reading circuit 2. The surface of the pressure sensor 50 is on the same level as the contact surface 32a of the image reading circuit 2. This surface of the pressure sensor 50 and the contact surface 32a form a placement surface on which the finger FN is to be placed.

The finger holder 16 will be explained below.

In the finger holder 16, an opening or a hole 16a is formed into the shape of a finger from the tip of the finger FN to its second joint, as shown in FIG. 3. The finger holder 16 is attached to the contact surface 32a of the image reading circuit 2 and the surface of the pressure sensor 50, so that the image input region 8 in which the sensor elements 20 are arranged and a pressure sensing region in which the intersections of the electrode lines 51 and 52 are arranged are exposed to the opening. That opening of the finger holder 16, which corresponds to a finger pad is formed in the image input region 8.

The circuit configuration of the fingerprint reader 1 will be described below with reference to FIG. 5.

Figure 5:
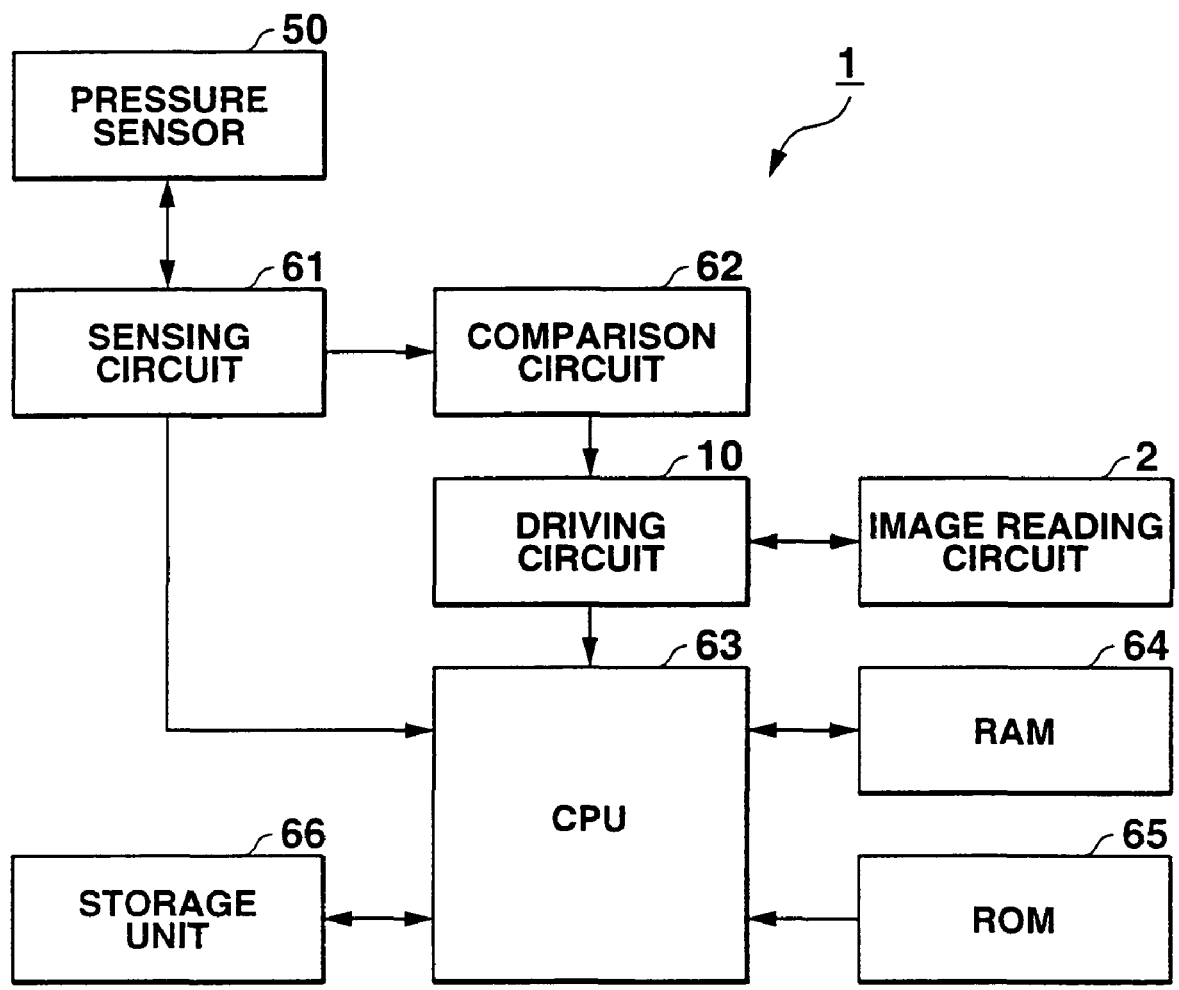
FIG. 5 is a block diagram showing the circuit configuration of the fingerprint reader.
Figure 6:
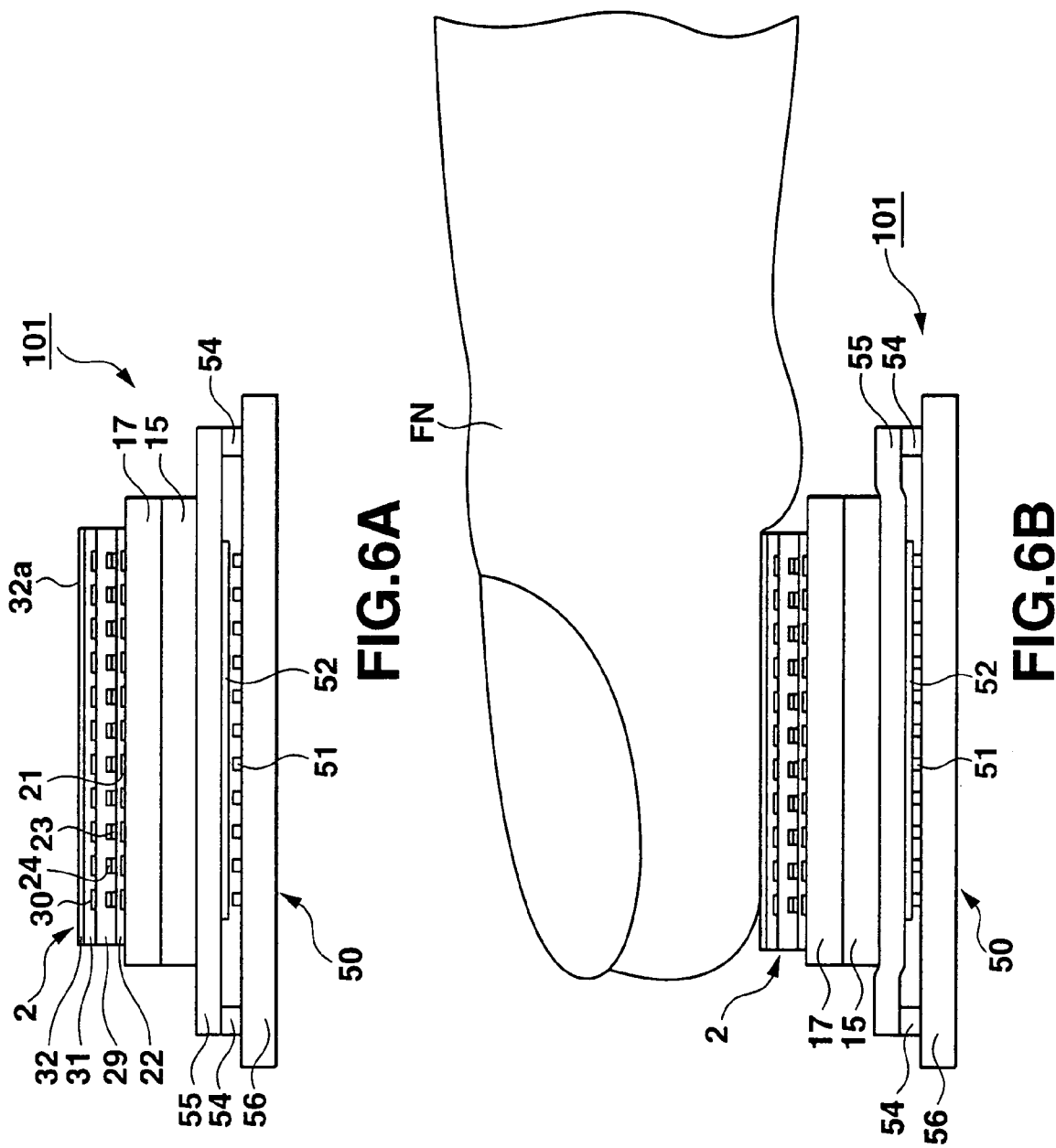
FIG. 6A is a sectional view showing the state in which no finger is placed on a fingerprint reader different from the above fingerprint reader.
FIG. 6B is a sectional view showing the state in which a finger is placed.

As shown in FIG. 5, the fingerprint reader 1 includes the sensing circuit 61, a comparison circuit 62, a CPU 63, a RAM 64, a ROM 65, and a storage unit 66, in addition to the image reading circuit 2, driving circuit 10, and pressure sensor 50.

The sensing circuit 61 drives the pressure sensor 50 to receive an electrical characteristic change or changes of a signal output to at least one of the electrode lines 51 and 52 of the pressure sensor 50, and outputs, to the comparison circuit 62, a sense signal indicating the level of the whole longitudinal pressure sensed by the pressure sensor 50. The sensing circuit 61 also outputs, to the CPU 63, pressure distribution data indicating the pressure distribution sensed by the pressure sensor 50.

The comparison circuit 62 receives the sense signal from the sensing circuit 61, and compares the level of the sense signal with a threshold value which discriminates between a finger placed state and finger unplaced state. If the sense signal level exceeds the threshold value, the comparison circuit 62 outputs a trigger signal to the driving circuit 10.

A sensing means comprises the pressure sensor 50, sensing circuit 61, and comparison circuit 62 described above. The sensing means senses, on the basis of the pressure applied to the surface of the pressure sensor 50, that the finger FN is placed on the contact surface 32a of the image reading circuit 2.

When receiving the trigger signal from the comparison circuit 62, the driving circuit 10 first outputs a signal for causing the light source 14 to emit light, thereby causing the light source 14 to emit light. After that, the driving circuit 10 outputs the control signal Bcnt to the bottom gate driver 12, the control signal Tcnt to the top gate driver 11, and the control signal Dcnt to the data driver 13. Consequently, the image reading circuit 2 starts operating. When the image reading circuit 2 thus operates, the driving circuit 10 acquires a fingerprint image of the finger FN, and outputs the fingerprint image data to the CPU 63.

The storage unit 66 stores registered fingerprint image data of a finger pad of each registrant. In addition to the area for storing the registered fingerprint image data, the storage unit 66 also has a data storage area storing various data. This data storage area has a specific area and normal area. The registered image data can be data representing the relative positions of a plurality of feature points extracted from a fingerprint, or an image itself.

The ROM 65 stores programs executable by the CPU 63. The CPU 63 operates in accordance with these programs stored in the ROM 65 by using the RAM 64 as a work area. For example, the CPU 65 receives fingerprint image data from the driving circuit 10, receives pressure distribution data from the sensing circuit 61, checks on the basis of the input pressure distribution data whether an object placed on the surface of the pressure sensor 50 can be regarded as a middle part of a finger, and, if an object placed on the surface of the pressure sensor 50 can be regarded as a middle part of a finger, compares the input fingerprint image data from the driving circuit 10 with the registered fingerprint image data stored in the storage unit 66, thereby checking whether the fingerprint image data can be regarded as matching the registered fingerprint image data. If the CPU 63 determines that the fingerprint image data can be regarded as matching the registered fingerprint image data, it starts a secret mode. If the CPU 63 determines that the fingerprint image data cannot be regarded as matching the registered fingerprint image data, it starts a normal mode.

The operation of the fingerprint reader 1 of this embodiment and a method of using the same will be explained below.

When nothing is in contact with the surface of the pressure sensor 50, the level of a sense signal indicating the whole longitudinal pressure sensed by the pressure sensor 50 is less than a threshold value. Therefore, the comparison circuit 62 outputs no trigger signal to the driving circuit 10.

On the other hand, as shown in FIG. 2A, when a person to be examined places a finger pad of the finger FN on the contact surface 32a of the antistatic film 32 and at the same time places a middle part of the finger FN on the surface of the pressure sensor 50, the light source 14 emits light. Output light from the diffusion light-guiding plate 15 is incident on the finger FN via the image reading circuit 2, and reflected light from the finger FN enters the semiconductor films 23 of the sensor elements 20. The longitudinal intensity distribution of the reflected light entering the semiconductor films 23 of the sensor elements 20 matches projections and recesses of the fingerprint of the finger FN. The light from the light source 14, which is incident on the projections of the finger FN in close contact with the contact surface 32a propagates in the skin of the finger FN and finally scatters toward the sensor elements 20 positioned below these projections. This scattered light having high intensity enters the semiconductor films 23 of the sensor elements 20 to generate electron-hole pairs. In the recesses of the finger FN which are separated from the contact surface 32a, the light is entrapped into the space between these recesses and the contact surface 32a, and attenuates by repeating irregular reflection between the recesses and space. Accordingly, no sufficient light is reflected toward the semiconductor films 23 of the sensor elements 20 below these recesses, so electron-hole pairs are not sufficiently generated.

Since the middle part of the finger FN is placed on the pressure sensor 50, a pressure is applied from the finger FN to the pressure sensor 50. If this pressure reaches such an extent that the finger FN well presses the pressure sensor 50, some of pressure sensing points at the intersections of the electrode lines 51 and 52 of the pressure sensor 50 are rendered conductive to produce potential changes. If the number of these conductive portions of the pressure sensing points reaches a predetermined number, the pressure level of a sense signal reaches the threshold value, so the comparison circuit 62 outputs a trigger signal to the driving circuit 10.

When receiving this trigger signal from the comparison circuit 62, the driving circuit 10 first outputs a signal for causing the light source 14 to emit light, so the light source 14 irradiates the contact surface 32a with light. Then, the driving circuit 10 outputs the control signal Tcnt to the top gate driver 11, the control signal Bcnt to the bottom gate driver 12, and the control signal Dcnt to the data driver 13.

In each of the sensor elements 20 in a predetermined row of the image reading circuit 2, a relatively positive voltage reset signal from the top gate driver 11 is applied to the top gate electrode 30 to discharge holes stored in the semiconductor film 23 and channel protective film 24 up to this point. Subsequently, a voltage of −20 (V) is applied to the top gate electrode 30 with the bottom gate electrode 23 held at 0 (V), thereby starting reading the reflected light from those projections and recesses of the finger FN, which form the fingerprint.

Since the projections of the finger FN are in contact with the contact surface 32a, these projections efficiently reflect the light from the light source 14 toward the semiconductor films 23 of the sensor elements 20 positioned below the projections, thereby generating a large amount of electron-hole pairs. Of these electron-hole pairs, only positively charged holes are trapped in the semiconductor films 23 and channel protective films 24 by a negative electric field applied to the top gate electrodes 30, and electrons are repelled by this electric field and discharged outside the sensor elements 20. On the other hand, the recesses of the finger FN are not in contact with the contact surface 32a. Therefore, the light from the light source 14 is irregularly reflected by the low-refractive-index space between the recesses and contact surface, and hence does not enter the semiconductor films 23 of the sensor elements 20 positioned below these recesses. As a consequence, holes are not sufficiently stored in the semiconductor films 23 and channel protective films 24.

The data driver 13 outputs a high-level, pre-charge signal to all the data lines 43 to cause them to hold a predetermined voltage.

When a predetermined time has elapsed since a voltage of −20 (V) is applied to the top gate electrodes 30, the bottom gate driver 12 applies a voltage of +10 (V) to the bottom gate electrodes 21. In this state, no sufficient light enters the sensor elements 20 positioned below the recesses of the finger FN and the sensor elements 20 below a portion where the finger FN is not placed, so no holes are stored in the semiconductor films 23 and channel protective films 24. In each semiconductor film 23, therefore, that electric field generated by the voltage of +10 (V) from the bottom gate electrode 21, which forms a channel is canceled by that electric field generated by the voltage of −20 (V) from the top gate electrode 30, which erases a channel. Consequently, a depletion layer extends in the semiconductor film 23 to allow no electric current to flow in the source-to-drain path, so the pre-charge voltage on the data line 43 is maintained.

Since the reflected light from the light source 14 well enters each sensor element 20 positioned below the projections of the finger FN, holes are stored in the semiconductor film 23 and channel protective film 24. These holes are attracted to the top gate electrode 30 by the electric field of −20 (V), and at the same time cancel the negative electric field of the top gate electrode 30 by the charge amount of the holes. Therefore, no channel is formed when the bottom gate electrode 21 is at 0 (V). However, when the bottom gate electrode 21 changes to +10 (V), the electric field of the bottom gate electrode 21 and the positive electric field generated by the stored holes become larger than the negative electric field of the top gate electrode 30, thereby forming a channel in the semiconductor film 23. Consequently, an electric current flows from the drain electrode 28 set at a high potential by the pre-charge voltage to the grounded source electrode 27, so the potential of the data line 43 lowers.

By reading that voltage drop on the data line 43, which changes in accordance with the presence/absence of incidence of light, the data driver 13 can detect a projection or recess of a finger. The above series of operations from the output of the reset signal to the read of the potential of the data line 43 are performed row by row.

The CPU 63 checks whether the input fingerprint image data from the sensor element 20 can be regarded as matching the registered fingerprint image data in the storage unit 66. If the CPU 63 determines that the fingerprint image data matches the registered fingerprint image data, the CPU 63 starts a secret mode. In the secret mode, the CPU 63 can access the specific area and normal area in the storage unit 66, (i.e., a door lock or the like is unlocked.) If the CPU 63 determines that the fingerprint image data does not match the registered fingerprint image data, it starts a normal mode. In this normal mode, the CPU 63 can access the normal area and cannot access the specific area in the storage unit 66, (i.e., the door lock or the like is not unlocked.)

The effects of this embodiment will be explained below.

Only by placing a portion from the first joint to the tip of the finger FN on the contact surface 32a of the image reading circuit 2 and at the same time placing a portion from the second joint to the first joint of the finger FN on the surface of the pressure sensor 50, it is possible to detect that the finger is placed and start reading a fingerprint image. Therefore, fingerprint reading can be simply started without causing a person to be examined to perform two steps, i.e., place his or her finger on a predetermined portion and press a button for starting fingerprint authentication. Also, since the image reading circuit 2 does not operate unless the finger FN is placed, the power consumption can be reduced.

As shown in FIG. 2B, at substantially the same time the finger FN is placed on the surface of the image reading circuit 2, a middle part of the finger FN is also placed on the surface of the pressure sensor 50 to apply a pressure from the finger FN to the pressure sensor 50. If a finger pad having a fingerprint of the finger FN is not placed in a broad range of the contact surface 32a of the image reading circuit 2, a voltage change indicates that the longitudinal pressure distribution on the contact surface 32a is biased, even when a sufficient pressure is applied to a few pressure sensing points. Accordingly, the pressure level of a sense signal does not reach a threshold value, so the image reading circuit 2 performs no image reading. This prevents an unclear image from being read. Since the light source 14 does not emit light, a person to be examined can see no light from the light source 14, so he or she notices that the image reading circuit 2 is not performing a reading operation.

If the person to be examined thus notices that the image reading circuit 2 is not performing a fingerprint reading operation because the finger FN is not pressed with a sufficient force against the image reading circuit 2 or the finger pad having the fingerprint is not in contact with a broad range of the contact surface 32a of the image reading circuit 2, it is possible to prompt the person to strongly press the finger FN against the image reading circuit 2 and pressure sensor 50 and press the finger pad having the fingerprint against a broad range. When the person presses the finger FN with a sufficient pressure against a broad range of the pressure sensor 50 so that the number of conductive portions of a plurality of pressure sensing points reaches a predetermined number, the pressure level of a sense signal reaches the threshold value, and the comparison circuit 62 outputs a trigger signal to the driving circuit 10, so the image reading circuit 2 starts reading the fingerprint. Since clear fingerprint image data can be reliably read, accurate authentication can be performed.

If the projections of the finger FN are not in close contact with the contact surface 32a of the image reading circuit 2, the contact pressure level between the finger FN and the surface of the pressure sensor 50 is lower than the threshold value. Therefore, a fingerprint image may become unclear if it is read in this state. However, the image reading circuit 2 does not perform an image reading operation unless the level of a sense signal indicating the pressure applied from the finger FN to the surface of the pressure sensor 50 is equal to or higher than the threshold value. Accordingly, no unclear fingerprint image data is read owing to insufficient pressing. In contrast, the image reading circuit 2 can reliably read a clear fingerprint image while a pressing force is applied to such an extent that the pressure sensor 50 can determine that it is pressed by the finger FN.

By setting the upper and lower limits of the threshold level of the comparison circuit 62, it is possible to allow the image reading circuit 2 to perform an image reading operation only when the contact pressure between the finger FN and the surface of the pressure sensor 50 falls within an appropriate range. This eliminates the inconvenience that optical fingerprint discrimination is made difficult to perform, or the fingerprint forms a distorted image to make accurate authentication impossible, because the difference between the heights of the projections and recesses of the finger FN is decreased by too strong pressing of the finger FN against the image reading circuit 2.

Second Embodiment

A fingerprint reader 101 different from the fingerprint reader 1 of the first embodiment will be described below with reference to FIGS. 6A to 8.

In the second embodiment, a diffusion light-guiding plate 15 overlaps an image reading circuit 2, and that surface of the diffusion light-guiding plate 15, which faces the rear surface of the image reading circuit 2 is in contact with the rear surface of the image reading circuit 2.

In the above first embodiment, the surface of the pressure sensor 50 is on the same level as the contact surface 32a of the image reading circuit 2. In the second embodiment, however, a pressure sensor 50 overlaps the diffusion light-guiding plate 15, and the surface of the pressure sensor 50 is in contact with the rear surface of the diffusion light-guiding plate 15. That is, the fingerprint reader 101 is obtained by stacking the pressure sensor 50, diffusion light-guiding plate 15, and image reading circuit 2 in this order from below. Therefore, a pressure applied to a contact surface 32a of the image reading circuit 2 is also applied to the pressure sensor 50, so the pressure sensor 50 can sense the pressure on the contact surface 32a of the image reading circuit 2. The pressure sensor 50 includes a plurality of electrode lines 51 formed on a substrate 56 and running parallel to each other in the row direction, a flexible sheet member 55 on the rear surface of which a plurality of electrode lines 52 running parallel to each other in the column direction are formed, and a seal 54 which covers the perimeter of the sheet member 55 and adheres the substrate 56 and sheet member 55. The electrode lines 52 are separated from the electrode lines 51. The sheet member 55 and substrate 56 are adhered such that the electrode lines 51 and 52 are perpendicular to each other when viewed from above and oppose each other. A pressure-sensitive ink layer may also be formed on the surface of at least one of the electrode lines 51 and 52. In this case, pressure-sensitive ink layers overlap each other at the intersections of the electrode lines 51 and 52. The electrical resistance between the electrode lines 51 and 52 depends upon a pressure applied to the pressure-sensitive ink layers; if the pressure changes, the electrical resistance or the like also changes. In the pressure sensor 50, the pressure at each intersection of the electrode lines 51 and 52 can be sensed by the electrical resistance or the like at the intersection.

Figure 8:
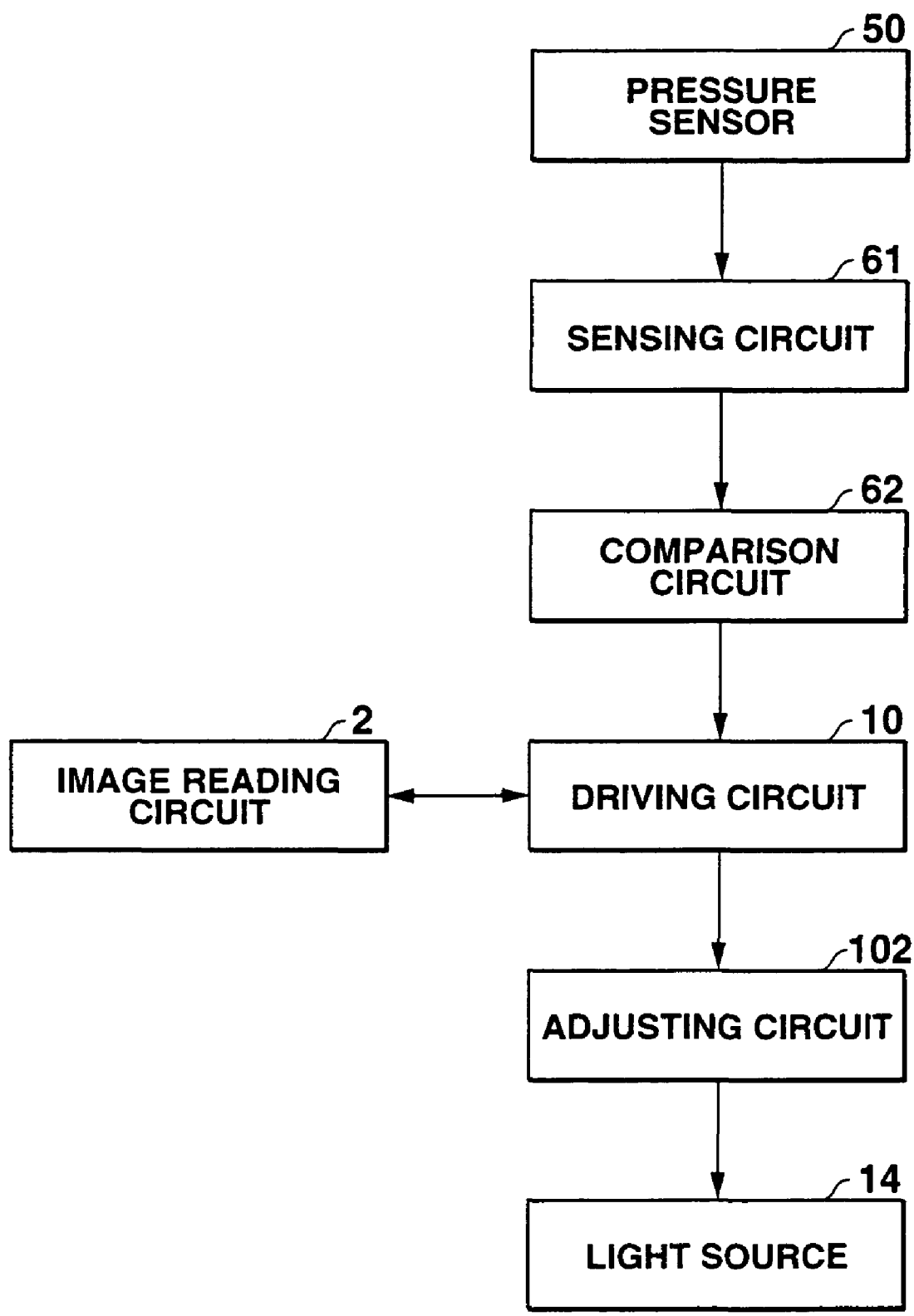
FIG. 8 is a block diagram showing the circuit configuration of the fingerprint reader shown in FIG. 7.

In addition to the circuit configuration shown in FIG. 5, the fingerprint reader 101 of the second embodiment has an adjusting circuit 102 for adjusting the light emission intensity of a light source 14 as shown in FIG. 8.

Referring to FIG. 8, a sensing circuit 61 outputs, to a comparison circuit 62, a sense signal indicating the level of the whole longitudinal pressure sensed by the pressure sensor 50. If the pressure level is within an allowable range over which a finger can be recognized, the comparison circuit 62 outputs, instead of a trigger signal, a pressure information signal indicative of this pressure level to a driving circuit 10. In accordance with the pressure level of this pressure information signal, the driving circuit 10 outputs a light emission gradation signal of the light source 14 to the adjusting circuit 102. The adjusting circuit 102 causes the light source 14 to emit light at brightness corresponding to the light emission gradation signal. That is, the adjusting circuit 102 causes the light source 14 to start light emission in accordance with the pressure level, and adjusts the level of electric power to be supplied to the light source 14 on the basis of the pressure level, thereby adjusting the light emission intensity of the light source. After the light source 14 emits light, the driving circuit 10 outputs a control signal Bcnt to a bottom gate driver 12 to cause the bottom gate driver 12 to appropriately output a read signal, outputs a control signal Tcnt to a top gate driver 11 to cause the top gate driver 11 to appropriately output a reset signal, and outputs a control signal Dcnt to a data driver 13 to cause the data driver 13 to appropriately output a precharge signal. The driving circuit 10 is so set that if the pressure level of the pressure information signal from the comparison circuit 62 falls within the allowable range and is low (the pressing force is small), the driving circuit 10 outputs, to the adjusting circuit 102, a light emission gradation signal by which the emission illuminance of the light source 14 increases, and, if the pressure level of the pressure information signal from the comparison circuit 62 falls within the allowable range and is high (the pressing force is large), the driving circuit 10 outputs, to the adjusting circuit 102, a light emission gradation signal by which the emission illuminance of the light source 14 decreases.

The constituent elements of the fingerprint reader 101 are the same as those of the fingerprint reader 1 except for those described above. Therefore, a detailed explanation of the image reading circuit 2, the pressure sensor 50, the sensing circuit 61, a CPU 63, a RAM 64, a ROM 65, and a storage unit 66 will be omitted.

The operation of the fingerprint reader 101 and a method of using it will be explained below.

When nothing is in contact with the contact surface 32a of the image reading circuit 2, as shown in FIG. 6A, the level of a sense signal output from the sensing circuit 61 to the comparison circuit 62 is low. Therefore, the comparison circuit 62 outputs no pressure information signal to the driving circuit 10, so the driving circuit 10 does not allow the light source 14 to emit light via the adjusting circuit 102.

Figure 7:
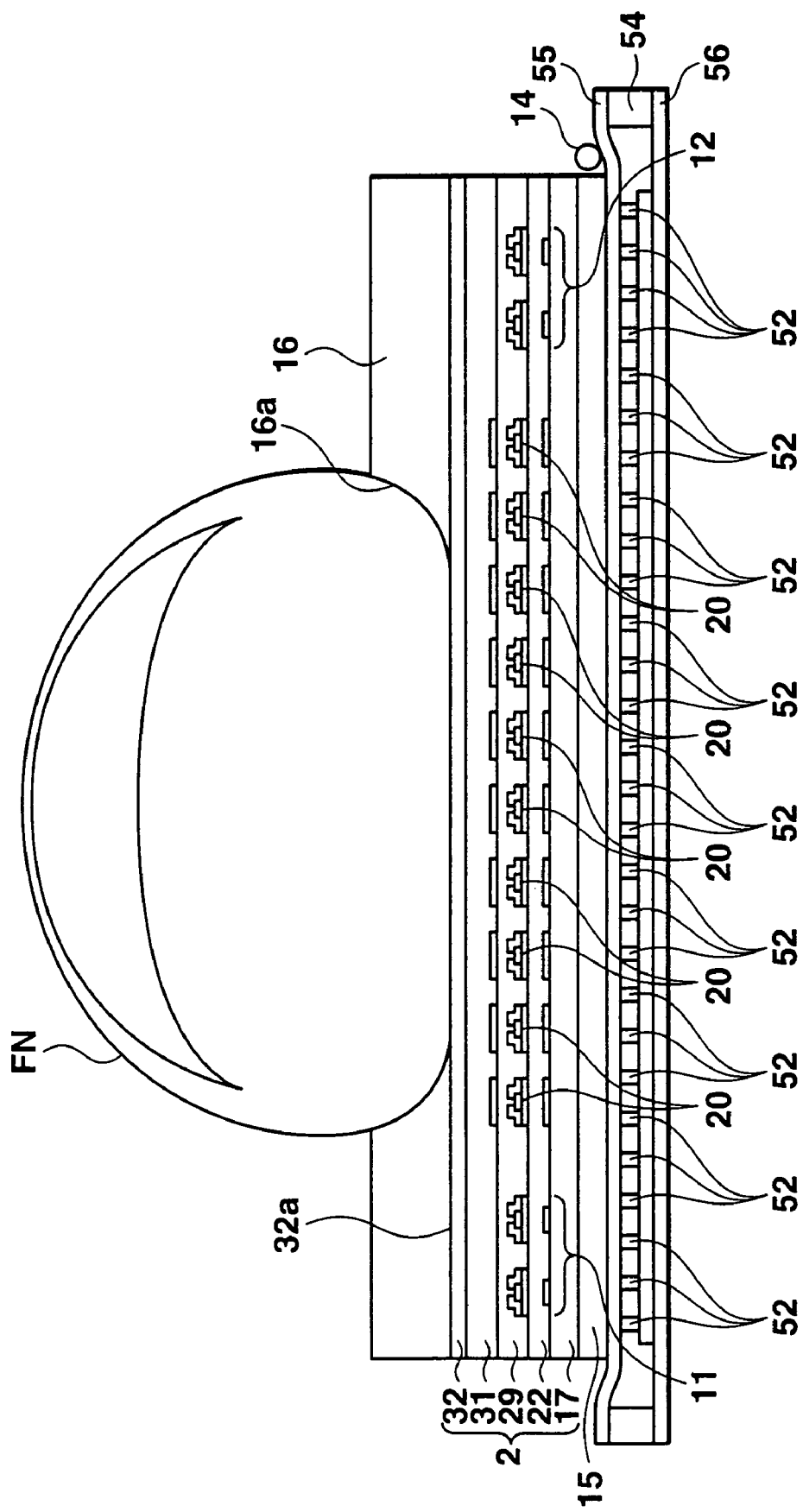
FIG. 7 is a sectional view showing the fingerprint reader shown in FIGS. 6A and 6B.

On the other hand, as shown in FIGS. 6B and 7, when a person to be examined places a finger pad of the finger FN on the contact surface 32a of an antistatic film 32, a pressure is applied from the finger FN to the pressure sensor 50 via the image reading circuit 2. Since the pressure level of a sense signal output from the sensing circuit 61 to the comparison circuit 62 is high, the comparison circuit 61 outputs, to the driving circuit 10, a pressure information signal containing recognition information indicating that the finger is placed and information indicating the degree of the pressing force, in accordance with the pressure level of the sense signal. In accordance with this pressure information signal, the driving circuit 10 outputs a light emission level signal to the adjusting circuit 102. On the basis of this light emission level signal, the adjusting circuit 102 causes the light source 14 to emit light with predetermined brightness. In this processing, the adjusting circuit 102 increases the light emission intensity of the light source 14 on the basis of the information of the light emission level signal, i.e., when the pressing force on the contact surface 32a of the image reading circuit 2 is low or decreases. If the output sense signal from the sensing circuit 61 to the adjusting circuit 102 becomes equal to or lower than the level when nothing is placed on the antistatic film 32, i.e., becomes equal to or lower than the level when no pressure is applied to the pressure sensor 50, the adjusting circuit 102 turns off the light source 14.

When the light source 14 emits light, this light is incident on the finger FN from the diffusion light-guiding plate 15 via the image reading circuit 2, thereby causing reflection and scattering on the finger FN. Although large amounts of reflected light and scattered light enter the sensor elements 20 positioned below projections of the finger FN, neither reflected light nor scattered light sufficiently enters the sensor elements 20 positioned below recesses of the finger FN.

After outputting the light emission gradation signal to cause the light source 14 to emit light, the driving circuit 10 outputs control signals to the drivers 11, 12, and 13 of the image reading circuit 2. The drivers 11, 12, and 13 transfer an electrical signal corresponding to the intensity of reflected light entering the sensor elements 20 in the image reading circuit 2 to the driving circuit 10 via the data driver 13. The driving circuit 10 acquires a fingerprint image of the finger FN by sensing the level of the electrical signal, and outputs the fingerprint image data to the CPU 63. The CPU 63 checks whether the input fingerprint image data can be regarded as matching registered fingerprint image data in the storage unit 66. If the fingerprint image data can be regarded as matching the registered fingerprint image data, the CPU 63 initiates a secret mode. If the fingerprint image data cannot be regarded as matching the registered fingerprint image data, the CPU 63 initiates a normal mode.

The effects of this embodiment will be explained below.

When the pressure of the finger FN is small or decreases, the contact area between projections of the finger FN and the contact surface 32a decreases. If this projections are not in close contact with the contact surface 32a any longer, low-intensity reflected light from the projection may enter the semiconductor film 23. However, since the light emission intensity of the light source 14 increases as the pressure of the finger FN decreases, the intensity of light incident on the finger FN also increases. Therefore, even when a projection of the finger FN is not in close contact with the contact surface 32a, high-intensity reflected light from the projections enters the semiconductor film 23.

Also, if the light emission intensity of the light source 14 is high even though the pressure of the finger FN is also high, high-intensity reflected light from recesses of the finger FN enters the semiconductor film 23. Consequently, the longitudinal intensity distribution of the reflected light entering the semiconductor films 23 of the sensor elements 20 becomes substantially uniform and bright. However, no such problem arises because the light emission intensity of the light source 14 decreases as the pressure of the finger FN increases.

In this embodiment, therefore, the image reading circuit 2 can clearly read a fingerprint image of the finger FN regardless of the pressure of the finger FN.

Also, the fingerprint reader 101 of the second embodiment achieves the same effects as the fingerprint reader 1 of the first embodiment.

The image input apparatus as described above can be applied as a person authentication system at a doorway or as an individual identification image input apparatus for restricting access to a personal computer or the like. The image input apparatus is particularly effective in a compact portable apparatus, such as a cell phone, notebook PC, or PDA, whose power consumption and size are limited.

Similar to the fingerprint reader 101 of the second embodiment, the fingerprint reader 1 of the first embodiment may also have the adjusting circuit 102 for adjusting the light emission intensity of the light source 14 as shown in FIG. 8, in addition to the circuit configuration shown in FIG. 5.

The present invention is not limited to the above embodiments and can be variously improved or changed in design without departing from the spirit and scope of the invention.

In each of the above embodiments, the finger FN is read. However, various other objects to be examined may also be pressed against the contact surface 32a of the antistatic film 32 and read, as well as the finger FN. By pressing an object to be examined against the contact surface 32a of the antistatic film 32, the image reading circuit 2 can read a pattern (including, e.g., characters, numerals, and pictures) drawn on the surface of the object, or a pattern defined by projections and recesses on the surface of the object.

In each of the above embodiments, the contact surface 32a of the antistatic film 32 is a placement surface on which an object to be examined is placed. However, this placement surface may also be the surface of an insulating film formed on the antistatic film 32. Also, the antistatic film 32 may be omitted.

The fingerprint reader 101 of the second embodiment having the structure in which the pressure sensor 50 is placed below the image reading circuit 2 need not always have the adjusting circuit 101 as shown in FIG. 8, but may also have the circuit configuration shown in FIG. 5. Likewise, the fingerprint reader 1 of the first embodiment having the structure in which the pressure sensor 50 is placed so as not to overlap the image reading circuit 2 need not always have the circuit configuration as shown in FIG. 5, but may also have the circuit configuration shown in FIG. 8.

Each of the above embodiments has been explained by taking the image reading circuit 2 using the sensor elements 20 as photoelectric conversion elements as an example. However, the present invention is also applicable to an image reading circuit using photodiodes as photoelectric conversion elements. Examples of the image reading circuit using photodiodes are a CCD image sensor and CMOS image sensor.

In the CCD image sensor, photodiodes are formed pixel by pixel in a matrix manner on a substrate. Around each photodiode, a vertical CCD and horizontal CCD for transferring an electrical signal photoelectrically converted by the photodiode are formed.

In the CMOS image sensor, photodiodes are formed pixel by pixel in a matrix manner on a substrate. Around each photodiode, a pixel circuit for amplifying an electrical signal photoelectrically converted by the photodiode is formed.

Furthermore, an image such as a fingerprint may also be read by a non-optical sensor which reads an electrical characteristic change caused by the electrostatic capacity unique to a finger, instead of the optical sensor described above.

What is claimed is:

1. An image input apparatus comprising:
   an image reading assembly including an optical sensor arranged under a placement surface on which an object to be examined is placeable;
   sensing means, arranged under the image reading assembly, for sensing whether the object is placed on the placement surface based on a pressure applied to the placement surface by the object; a light source which emits light and illuminates the object with the light, and which is arranged between the image reading assembly and the sensing means; and
   a diffusion light-guiding plate which is arranged between the image reading assembly and the sensing means, and which guides the light emitted by the light source from the light source to the object, when the sensing means senses that the object is placed on the placement surface;
   wherein the sensing means senses the pressure through the diffusion light-guiding plate.

2. The image input apparatus according to claim 1, further comprising driving means for causing the image reading assembly to perform an image reading operation, when the sensing means senses that the object is placed on the placement surface.

3. The image input apparatus according to claim 1, wherein the sensing means comprises:
   a pressure sensor which senses the pressure applied to the placement surface; and
   comparing means for comparing a pressure level sensed by the pressure sensor with a threshold value for discriminating between a placed state and an unplaced state and, if the threshold value is exceeded, outputting a trigger signal for causing the image reading assembly to perform an image reading operation.

4. The image input apparatus according to claim 1, further comprising adjusting means for controlling the light source so that the brightness of the light from the light source is adjusted in accordance with the pressure applied to the placement surface by the object.

5. The image input apparatus according to claim 1, wherein the optical sensor comprises a plurality of double-gate transistors arranged in a matrix manner.

6. The image input apparatus according to claim 1, further comprising a holder for holding the object such that the object is properly placed in positions of the image reading assembly and the sensing means.

\* \* \* \* \*